(12) United States Patent
Cota González et al.

(10) Patent No.: US 10,216,468 B2
(45) Date of Patent: Feb. 26, 2019

(54) CLUSTER-RADIO INFORMATION INTERCHANGE SYSTEM FOR ENHANCING HUMAN-MACHINE INTERFACE EXPERIENCE

(71) Applicant: Continental Automotive Systems, Inc., Auburn Hills, MI (US)

(72) Inventors: Miguel Ernesto Cota González, Tlaquepaque (MX); Romero González Felipe de Jesús, Tlaquepague (MX); Paulina Gallardo Gutierrez, Zapopan (MX); Fernando Luevanous Peña, Zapopan (MX); Amilcar Cervantes Romero, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/465,035

(22) Filed: Aug. 21, 2014

(65) Prior Publication Data
US 2016/0054967 A1    Feb. 25, 2016

(51) Int. Cl.
*G06F 3/14* (2006.01)
*B60K 35/00* (2006.01)
(Continued)

(52) U.S. Cl.
CPC .............. *G06F 3/1423* (2013.01); *B60K 35/00* (2013.01); *G06F 3/023* (2013.01); *G06F 3/041* (2013.01);
(Continued)

(58) Field of Classification Search
CPC .............. B60K 35/00; B60K 2350/104; B60K 2350/1068; B60K 2350/352; G06F 3/023;
(Continued)

(56) References Cited

U.S. PATENT DOCUMENTS 5,732,368 A    3/1998    Knoll et al.
6,812,942 B2    11/2004    Ribak
(Continued)

FOREIGN PATENT DOCUMENTS

| CN | 1922049 A | 2/2007 |
|---|---|---|
| CN | 102582440 A | 7/2012 |

(Continued)

OTHER PUBLICATIONS

English Translation of DE 102009006896.

*Primary Examiner* — Stephen G Sherman

(57) ABSTRACT

A display system for a vehicle includes an instrument cluster having a cluster display constructed and arranged, in a default cluster mode of operation, to display vehicle operating information. A radio display is separate from and disposed generally adjacent to the cluster display. The radio display is constructed and arranged, in a default radio mode of operation, to display media information. A controller is in communication with the cluster display and with the radio display. The controller is constructed and arranged, based on an input, to cause the media information to be shown on the cluster display in place of the operating information displayed during the default cluster mode of operation. Simultaneously, the operating information can be shown on the radio display in place of the radio information.

3 Claims, 3 Drawing Sheets

(51) Int. Cl.
*G06F 3/023* (2006.01)
*G06F 3/041* (2006.01)
*H04H 40/45* (2008.01)

(52) U.S. Cl.
CPC ....... *H04H 40/45* (2013.01); *B60K 2350/104* (2013.01); *B60K 2350/1068* (2013.01); *B60K 2350/352* (2013.01); *G09G 2380/10* (2013.01)

(58) Field of Classification Search
CPC ....... G06F 3/041; G06F 3/1423; H04H 40/45; G09G 2380/10
See application file for complete search history.

(56) References Cited

U.S. PATENT DOCUMENTS

| | | | |
|---|---|---|---|
| 2002/0085043 A1* | 7/2002 | Ribak | B60K 35/00 |
| | | | 715/810 |
| 2011/0037583 A1 | 2/2011 | Fitzgerald et al. | |
| 2011/0166748 A1* | 7/2011 | Schneider | B60K 35/00 |
| | | | 701/36 |
| 2014/0146168 A1* | 5/2014 | Fritsch | G06T 11/60 |
| | | | 348/118 |

FOREIGN PATENT DOCUMENTS

| | | |
|---|---|---|
| CN | 202541328 U | 11/2012 |
| DE | 4433953 A1 | 9/1994 |
| DE | 102006028463 A1 | 6/2006 |
| DE | 102009006896 A1 | 8/2010 |
| EP | 1342605 A1 | 9/2003 |
| EP | 1342605 B1 | 7/2006 |
| JP | 2005239042 | 9/2005 |
| JP | 2009113616 | 5/2009 |
| WO | 9713657 A1 | 10/1996 |

* cited by examiner

CLUSTER-RADIO INFORMATION INTERCHANGE SYSTEM FOR ENHANCING HUMAN-MACHINE INTERFACE EXPERIENCE

FIELD

The invention relates to displays for a vehicle and, more particularly, to a system for interchanging the graphical information between a radio display and a cluster display, to enhance the human-machine interface experience.

BACKGROUND

In conventional vehicles, typically a cluster display is provided directly adjacent to the steering wheel and in front of the driver. The cluster digitally displays vehicle I information such as the vehicle speed, engine revolutions per minute (RPR), fuel level and other information. The radio display is typically offset from the cluster display, generally located to the side of the cluster display and not in direct line of sight with the driver. If the driver wants to view the media information on the radio display, the driver may need to look away from the road which may result in an unsafe condition. This is especially true if the radio display includes navigational information being viewed by the driver.

There is a need for a system for a vehicle that enables a driver to interchange the graphical information between a radio display and a cluster display on demand so that information currently desired by the driver is in directly line of sight with the driver.

SUMMARY

An objective of the invention is to fulfill the need referred to above. In accordance with the principles of an embodiment, this objective is obtained by providing a display system for a vehicle. The system includes an instrument cluster having a cluster display constructed and arranged, in a default cluster mode of operation, to display vehicle operating information. A radio display is separate from and disposed generally adjacent to the cluster display. The radio display is constructed and arranged, in a default radio mode of operation, to display media information. A controller is in communication with the cluster display and with the radio display. The controller is constructed and arranged, based on an input, to cause the media information to be shown on the cluster display in place of the operating information displayed during the default cluster mode of operation. Simultaneously, the operating information can be shown on the radio display in place of the radio information.

In accordance with another aspect of an embodiment, a method of controlling displayed information in a vehicle provides an instrument cluster including a cluster display. Vehicle operating information is displayed on the cluster display during a default cluster mode of operation. A radio display is provided separate from the cluster display. Media information is displayed on the radio display during a default radio mode of operation. An input is provided and based on the input, the media information is shown on the cluster display in place of the operating information displayed during the during a default cluster mode of operation.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
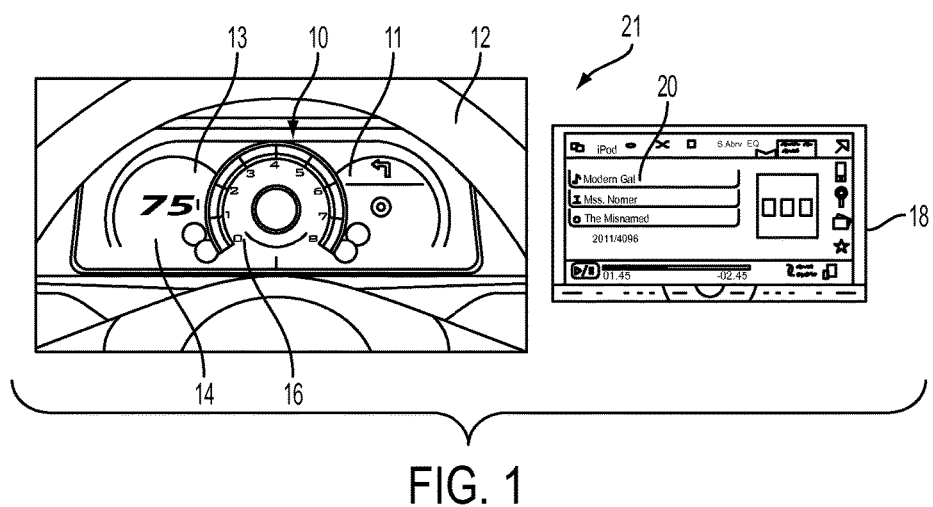
FIG. 1 is view of a vehicle display system including an electronic instrument cluster display disposed behind a steering wheel and a radio display adjacent to the cluster display, in accordance with an embodiment.

With reference to FIG. 1, an electronic instrument cluster for a vehicle is shown, generally indicated at 10. The cluster 10 includes a digital cluster display 11 disposed behind a steering wheel 12 of the vehicle in the conventional manner. The cluster display 11 is a digital display screen and displays vehicle operating information 13. For example, in a default cluster mode of operation, the cluster display 11 can show a speedometer 14, a tachometer 16, trip computer, and/or other graphical information typically provided on a vehicle cluster 10. A radio display 18 is separate from and generally adjacent to the cluster display 11. The radio display 18 may be disposed in the dashboard as in FIG. 2, or may be of the retractable kind, which rises from inside the dashboard when the vehicle is started. The radio display 18 is preferably a conventional touch-screen operated display configured for controlling and displaying media information 20. For example, in a default radio mode of operation, the radio display can display media information 20 such as radio information, navigational information, the back-up camera view, and/or other conventional graphical media information. The radio display 18 and cluster display 11 are part of a vehicle display system, generally indicated at 21.

Figure 2:
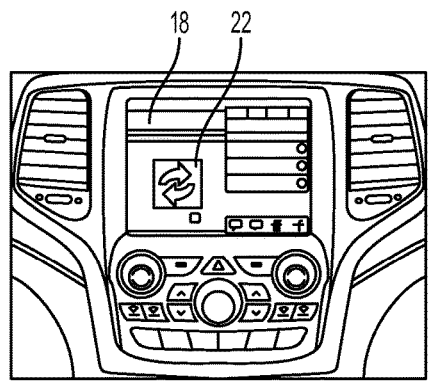
FIG. 2 is a view of the radio display having a touch screen defining an input to cause the media information on the radio display to be swapped with the operating information on the cluster display in accordance with an embodiment.
Figure 4:
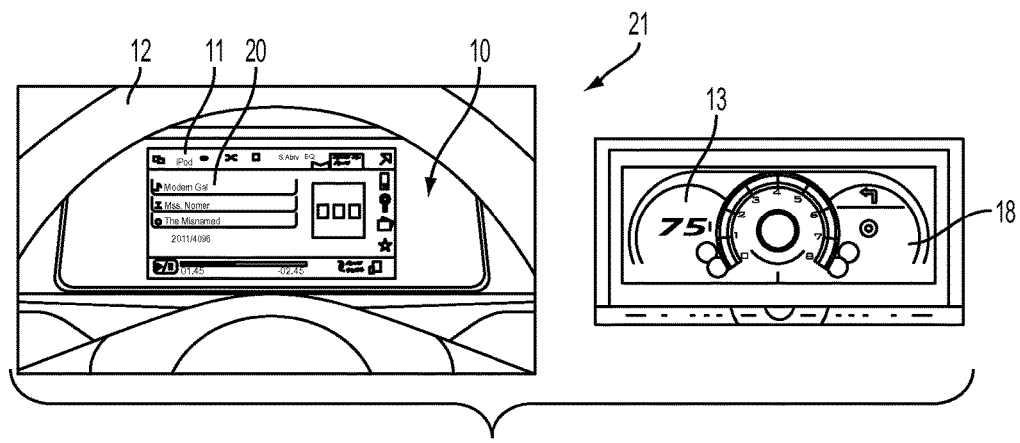
FIG. 4 is view of the cluster display and radio display of FIG. 1, but shown with the information swapped in position so that the radio display shows the information that was on the cluster display, and the cluster display shows the information that was on the radio display.

There are times when a driver of the vehicle may be more interested in the media information 20 on the radio display 18 than the operating information 13 on the cluster display 11. With reference to FIG. 2, an input 22 is provided on the touch screen of the radio display 20 that can be activated by the driver to cause the media information 20 to be interchanged (swapped) in positon with the operating information 13. Thus, with reference to FIG. 4, after the input 22 is activated by touching, dragging, etc., the media information 20 that was on the radio display 18 (during the default radio mode of operation) is now shown on the cluster display 11 (replacing the operating information 13 that was shown during the default cluster mode of operation). Simultaneously, operating information 13 that was on the cluster display 10 (during the default cluster mode of operation) is now shown on the radio display 18 (replacing the media information 20 that was shown on the default radio mode of operation). This ensures that the media information 20 is now in the line of sight of the driver and improves the driver's human-machine interface experience, giving the driver a new sense of control. Also, the driver knows that the operating information 13 (e.g., trip computer) now on the radio display 13 is still available. The driver can activate the input 22 again to return the information back to the default modes where the media information 20 is again shown on the radio display 18 and the operating information 13 is again shown on the cluster display 11. Alternatively, the return of the information to the default modes can occur after a preset timeframe.

Figure 5:
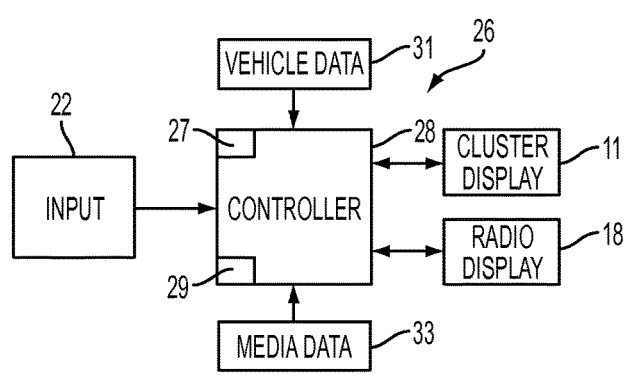
FIG. 5 is a schematic illustration of an instrument control system of an embodiment.

With reference to FIG. 5 a system, generally indicated at 26, is shown for controlling the interchanging of the information 13 and 20. The radio display 18 and cluster display 11 normally operates in the default modes showing the respective information described above. A controller 28, having a processor 27 and an optional timer 29, receives vehicle data 31 to generate the vehicle information 13 shown on the cluster display 11 and receives media data 33 to generate the media information 20 shown on the radio display 18. When a swap of the displayed information is desired, the controller 28 receives the input 22 and controls the information 13 and 20 (e.g., video) that is shown in the respective display 11 and 18. The video information 13 and 20 can be transmitted by composite video, audio video bridging (AVB), low-voltage differential signaling (LVDS), or other conventional methods. The timer 29 can be configured to signal the return of the information to the default modes as discussed above.

Since the cluster display 11 is typically not touch activated for safety reasons, in order to change the medial information 20 of the radio display 18 that is to be swapped with the operating information 13 of the cluster display 11, the driver preferably controls the touch screen of the radio display 18 to display the desired media information 20 and then activates the input 22 to make the media information 20 swap with the operator information 13. Alternatively, changing the media information 20 that is shown on the cluster display 11 can be done by voice commands or by activating steering wheel buttons 23 (FIG. 3).

Figure 6:
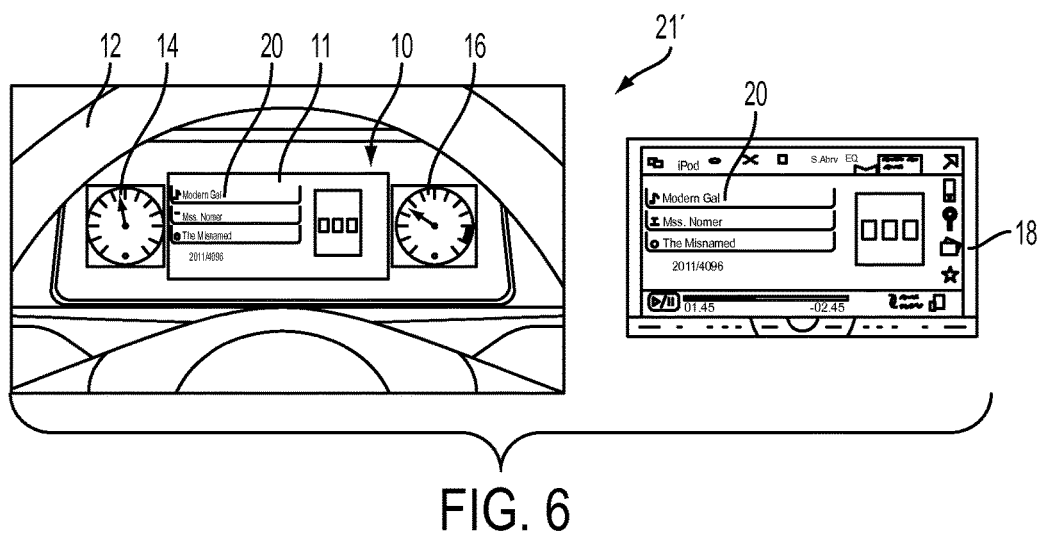
FIG. 6 is view of a vehicle display system including an electronic instrument cluster display and a radio display, with the information of the radio display shown both at the radio display and on the cluster display, in accordance with another embodiment.

FIG. 6 shows another embodiment of a vehicle display system 21'. Once the input 22 is activated, the media information 20 from the radio display 18 can be shown on the cluster display 11 without swapping the operating information 13 to the radio display 18. Thus, this is a one-way transfer of the media information 20 to the cluster display 11, with the radio display 18 showing the duplicate media information 20 or showing a blank screen. In this embodiment, the gauges e.g., speedometer 14 and tachometer 16 are separate from the cluster display 11 and remain visible on the instrument cluster 10 while the media information 20 is displayed on the cluster display 11.

Figure 3:
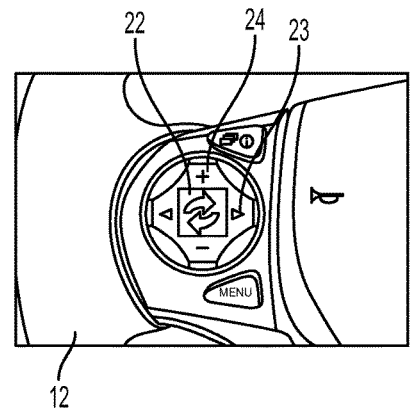
FIG. 3 is a view of a button on a steering wheel of a vehicle that defines an input to cause the media information on the radio display to be swapped with the operating information on the cluster display in accordance with another embodiment.

Instead of providing the input 22 on the touch screen radio display 18, with reference to FIG. 3, the input 22 can be configured as a button activated switch 24, preferably on the steering wheel 12 of the vehicle, which is engaged by the driver. Still further, a hand sensor can detect a swiping movement of the driver, defining the input 22.

By enabling the media information 20 to be shown on the cluster display 11 while the radio display 18 shows the operating information 13 or shows a duplicate of the media information 20 or a blank screen, the driver's human-machine experience is enhanced. Also, since the media information 20 is in direct line of sight with the driver, the driver need not avert his eyes significantly to see this information.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A display system for a vehicle having a dashboard, the display system comprising:
    an instrument cluster including a cluster display constructed and arranged, in a default cluster mode of operation, to display vehicle operating information;
    a retractable radio display separate from and disposed generally adjacent to the cluster display, the retractable radio display being constructed and arranged to rise from inside the dashboard when the vehicle is started and, in a default radio mode of operation, to display media information; and
    a controller in communication with the cluster display and the retractable radio display and constructed and arranged to:
        cause the display of a dedicated input icon on the retractable radio display;
        detect an actuation of the dedicated input icon on the retractable display; and
        responsive to detecting the actuation of the input icon causing only:
    the media information to be removed from the cluster display displayed instead of on the cluster display while simultaneously causing the vehicle operating information be removed from the and displayed instead on the retractable radio display.

2. The display system of claim 1, wherein information from the retractable radio display that is copied onto the cluster display, is displayed on the cluster display such that it is in a middle of the cluster display.

3. The display system of claim 1, wherein the instrument cluster includes a speedometer and a tachometer, each separate from the cluster display, and each being constructed and arranged to remain visible on the instrument cluster while the media information is displayed on the cluster display.

* * * * *